United States Patent
Wang et al.

(10) Patent No.: US 12,522,527 B2
(45) Date of Patent: Jan. 13, 2026

(54) DEVICE AND METHOD FOR MAINTAINING STABILITY OF ANAEROBIC AMMONIUM OXIDATION (ANAMMOX) BY USING COMBINED ZEOLITE FILLER TO RESIST WATER QUALITY FLUCTUATIONS

(71) Applicant: Beijing University Of Technology, Beijing (CN)

(72) Inventors: Bo Wang, Beijing (CN); Shuo Wang, Beijing (CN); Wenjie Li, Beijing (CN); Yu Dai, Beijing (CN); Lu Wang, Beijing (CN)

(73) Assignee: Beijing University Of Technology, Beijing (CN)

( * ) Notice: Subject to any disclaimer, the term of this patent is extended or adjusted under 35 U.S.C. 154(b) by 279 days.

(21) Appl. No.: 18/539,337

(22) Filed: Dec. 14, 2023

(65) Prior Publication Data
US 2024/0228343 A1    Jul. 11, 2024

Related U.S. Application Data

(63) Continuation of application No. PCT/CN2023/106231, filed on Jul. 7, 2023.

(30) Foreign Application Priority Data

Jan. 8, 2023   (CN) .......................... 202310022755.0

(51) Int. Cl.
*C02F 3/00* (2023.01)
*C02F 1/20* (2023.01)
(Continued)

(52) U.S. Cl.
CPC ............... *C02F 3/006* (2013.01); *C02F 1/20* (2013.01); *C02F 1/281* (2013.01); *C02F 3/307* (2013.01);
(Continued)

(58) Field of Classification Search
CPC ........ C02F 1/20; C02F 1/281; C02F 2101/16; C02F 2209/02; C02F 2209/06;
(Continued)

(56) References Cited

U.S. PATENT DOCUMENTS

2019/0039926 A1*   2/2019   Shirazi ................. C12N 11/082

FOREIGN PATENT DOCUMENTS

| CN | 101054233 A | 10/2007 |
|---|---|---|
| CN | 106966500 A | 7/2017 |

(Continued)

*Primary Examiner* — Dirk R Bass
(74) *Attorney, Agent, or Firm* — Bayramoglu Law Offices LLC

(57) ABSTRACT

A device and a method for maintaining the stability of anaerobic ammonium oxidation (anammox) by using a combined zeolite filler to resist water quality fluctuations are provided. The device includes a water inlet tank, an anammox reactor, and a water outlet tank, where the anammox reactor is filled with the combined zeolite filler maintained in a state of suspension, domestic sewage enters the anammox reactor through a water inlet pump, and effluent water enters the water outlet tank through an overflow port. The device combines the physical characteristics of zeolite adsorption of ammonium with the anammox process: when the concentration of ammonium in the influent water is too high, the zeolites will temporarily store the excess ammonium adsorbed; when the concentration of nitrite in the influent water is too high, the zeolites are capable to release the stored ammonium into a liquid phase through balanced adsorption desorption.

1 Claim, 2 Drawing Sheets

(51) Int. Cl.
*C02F 1/28* (2023.01)
*C02F 3/30* (2023.01)

(52) U.S. Cl.
CPC ...... *C02F 2209/02* (2013.01); *C02F 2209/06* (2013.01); *C02F 2209/14* (2013.01); *C02F 2209/15* (2013.01); *C02F 2209/22* (2013.01); *C02F 2209/44* (2013.01)

(58) Field of Classification Search
CPC .............. C02F 2209/14; C02F 2209/15; C02F 2209/22; C02F 2209/44; C02F 3/006; C02F 3/307
See application file for complete search history.

(56) References Cited

FOREIGN PATENT DOCUMENTS

| | | | |
|---|---|---|---|
| CN | 108217944 A | 6/2018 | |
| CN | 112897684 A | 6/2021 | |
| CN | 113716697 A | 11/2021 | |
| CN | 115925112 A | 4/2023 | |

\* cited by examiner

DEVICE AND METHOD FOR MAINTAINING STABILITY OF ANAEROBIC AMMONIUM OXIDATION (ANAMMOX) BY USING COMBINED ZEOLITE FILLER TO RESIST WATER QUALITY FLUCTUATIONS

CROSS REFERENCE TO THE RELATED APPLICATIONS

This application is a continuation application of International Application No. PCT/CN2023/106231, filed on Jul. 7, 2023, which is based upon and claims priority to Chinese patent application Ser. No. 202310022755.0, filed on Jan. 8, 2023, the entire contents of which are incorporated herein by reference.

TECHNICAL FIELD

The present invention relates to a device and method for maintaining the stability of anaerobic ammonium oxidation (anammox) by using a combined zeolite filler to resist water quality fluctuations, and belongs to the field of biological sewage treatment.

BACKGROUND

As a new denitrification process, anaerobic ammonium oxidation (anammox) can use nitrite as an electron acceptor to oxidize ammonium to nitrogen under anoxic conditions, opening up a new way for nitrogen cycling. Anammox is currently the most promising biological denitrification technology. Compared with the traditional nitrification and denitrification process, the anammox process has the advantages of reducing aeration energy consumption, carbon source dosage, greenhouse gas emissions, and sludge production. At present, the anammox process is mostly used to treat side-flow high-ammonium wastewater, but the fluctuating ammonium concentration and changing environmental conditions of the actual wastewater limit the full-scale application of the anammox process. In particular, the actual wastewater usually lacks the nitrite substrate. Therefore, the anammox process usually needs to be combined with partial nitrification and partial denitrification processes to supply the suitable substrate for anammox bacteria.

The partial nitrification-anammox process is that ammonium oxidizing bacteria oxidize ammonium to nitrite under aerobic conditions, and anammox bacteria then convert nitrite and ammonium into nitrogen. Since ammonium oxidizing bacteria and anammox bacteria are autotrophic bacteria, the partial nitrification-anammox process does not require an organic carbon source, which saves 60% of aeration cost compared with the traditional processes of nitrification and denitrification for denitrification. In the partial nitrification-anammox process, the partial nitrification process is a rate-limiting step, and its stability is crucial to the denitrification effect. When the effect of partial nitrification is ideal nitrogen mainly exists in the form of nitrite; when the effect of partial nitrification is not ideal, nitrogen mainly exists in the form of ammonium, and the unstable partial nitrification performance makes it difficult to steadily supply substrates for anammox reactions.

Zeolites are hydrous aluminosilicate minerals whose crystal structure is a tetrahedron of silicon and oxygen ions. When positive tetravalent ammonium ions are replaced by positive trivalent silicon ions, the zeolite structure will contain excessive negative charges. In order to balance these negative charges, zeolite will adsorb alkali metal or alkaline earth metal ions, which are mainly sodium ions, magnesium ions, and calcium ions. The alkali metal and alkaline earth metal ions in the zeolite are easily ion-exchanged with other cations around them, and have strong selective adsorption capacity particularly for ammonium ions. In addition, there exist a large number of pores and channels inside the zeolite. Such adsorption and ion-exchange characteristics make zeolite become a common ammonium adsorbent, and the zeolite is widely applied to treat ammonium wastewater of various concentrations.

According to some studies, zeolites are capable to achieve stable partial nitrification, and combining zeolites with the anammox process can balance the impact of an unstable partial nitrification reaction on the anammox denitrification performance: if insufficient nitrite is generated from partial nitrification, which means that nitrogen still exists in the form of ammonium, then the zeolites can absorb excessive ammonium; and if excessive nitrite is generated from the partial nitrification, then the zeolites can desorb the previously adsorbed ammonium. The unstable partial nitrification performance results in that the influent water is in a fluctuating state. Based on the above principles, the zeolites can maintain a relatively stable and suitable ratio of nitrite to ammonium for anammox bacteria, thereby stabilizing the denitrification performance of the anammox reaction.

SUMMARY

The present invention proposes a device and method for maintaining the stability of anaerobic ammonium oxidation (anammox) by using a combined zeolite filler to resist water quality fluctuations, which can maintain a relatively stable ratio of nitrite to ammonium by utilizing the characteristics of zeolite adsorption and desorption of ammonium under the conditions of irregularly fluctuating influent substrates, so as to stably supply the substrates for the anammox reaction and ensure the systemic and efficient denitrification.

An objective of the present invention is to solve the problems by means of the following technical solutions:

1. A device for maintaining the stability of anammox by using a combined zeolite filler to resist water quality fluctuations, where the device includes a water inlet tank (1), an anammox reactor (2), and a water outlet tank (3); the water inlet tank (1) is provided with a heating rod (1.1) and a water inlet pump (1.2); the anammox reactor (2) is provided with a water inlet (2.1), a combined zeolite filler (2.2), an on-line pH/DO detector (2.3), a reflux inlet (2.4), a reflux pump (2.5), and an overflow port (2.6). The combined zeolite filler (2.2) is provided with a polypropylene mesh spherical shell (2.2.1), zeolite particles (2.2.2), and polystyrene foams (2.2.3);

Experimental device connection: the water inlet tank (1) is connected with the water inlet (2.1) of the anammox reactor (2) through the water inlet pump (1.2); the anammox reactor (2) is connected with the water outlet tank (3) through the overflow port (2.6).

2. A method for maintaining the stability of anammox by using a combined zeolite filler to resist water quality fluctuations, where the specific start-up and operation control steps are as follows:

2.1) start-up phase:
the anammox reactor is started in a continuous-flow mode, the inoculated sludge is anammox granular sludge, and the concentration of sludge in the reactor is controlled at 3000-4000 mg/L; the heating rod controls the water inlet temperature within a range of 30-35° C.; the pH value falls within a range of 7-8; the hydraulic retention time is 10-15 h; the influent water has a nitrite concentration of 60-90 mg/L and an ammonium concentration of 50-70 mg/L, and the ratio of the two is controlled at 1.32; the influent water is specifically composed of the following substances: 60-90 mgN/L of $NaNO_2$, 50-70 mgN/L of $NH_4Cl$, 0.5-1.0 g/L of $NaHCO_3$, 20-40 mg/L of $KH_2PO_3$, 100-300 mg/L of $CaCl_2 \cdot 2H_2O$, 100-300 mg/L of $MgSO_4 \cdot 2H_2O$, 0.5-1.0 mL/L of a trace element I solution, and 0.5-1.0 mL/L of a trace element II solution, where mL is a unit of the volume of the added trace element I solution or the trace element II solution, L is a unit of the total volume of the influent water, and the above concentrations are the final concentrations of various substances in the influent water; the trace element I solution or the trace element II solution is prepared based on the following matrix ratio with water as a solvent, and the trace element I solution includes: 6-7 g/L of EDTA·2Na, and 5-6 g/L of $FeSO_4 \cdot 7H_2O$; the trace element II solution includes: 18-20 mg/L of EDTA·2Na, 0.01-0.02 mg/L of $H_3BO_3$, 0.4-0.5 mg/L of $ZnSO_4 \cdot 7H_2O$, 0.2-0.3 mg/L of $CoCl_2 \cdot 6H_2O$, 0.2-0.3 mg/L of $CuSO_4 \cdot 5H_2O$, 0.9-1.0 mg/L of $MnCl_2 \cdot 4H_2O$, 0.1-0.2 mg/L of $NiCl_2 \cdot 6H_2O$, and 0.2-0.3 mg/L of $NaMoO_4 \cdot 2H_2O$; after stripping for deaeration by nitrogen, the influent water continuously flows into the anammox reactor through a water inlet pump; the combined zeolite filler is added inside the reactor, the dosing ratio is 30-40%, and the inside of the polypropylene mesh spherical shell is filled with the zeolite particles with a diameter of 3-8 mm and the polystyrene foams, the diameters of the two are larger than the mesh diameter of the spherical shell, so that the zeolite particles and the polystyrene foams will not fall out, and the zeolite particles and the polystyrene foams are filled at a volume ratio of 1:1-1:2 to ensure that they can be suspended inside the reactor; the reflux pump controls the reflux ratio at 300-500%, thus preventing the combined zeolite filler from settling; when the concentrations of nitrite and ammonium in the effluent water are both less than 5 mg/L, and the removal rate of total nitrogen stably remains at above 70% for more than 14 days, it indicates that the anammox reactor has been started successfully;

2.2) operation phase:

2.2.1) simulated water quality fluctuation phase: the heating rod controls the water inlet temperature within a range of 30-35° C.; the pH value falls within a range of 7-8; the hydraulic retention time is 10-15 h; the influent water includes nitrite and ammonium whose concentrations fluctuate at 30-70 mg/L, and every two times of hydraulic retention constitutes a cycle: the concentration of nitrite in the influent water in the first hydraulic retention time is 30-50 mg/L, and the concentration of ammonium therein is 50-70 mg/L, at this time, relatively excessive ammonium will be adsorbed by zeolites; the concentration of nitrite in the influent water in the second hydraulic retention time is 50-70 mg/L, and the concentration of ammonium therein is 30-50 mg/L, in this case, the nitrite is relatively surplus, and the zeolites desorb the ammonium adsorbed in the previous cycle into a liquid phase, thereby providing a substrate for the growth of anammox bacteria; the influent water is specifically composed of the following substances: 30-70 mgN/L of $NaNO_2$, 30-70 mgN/L of $NH_4Cl$, 0.5-1.0 g/L of $NaHCO_3$, 20-40 mg/L of $KH_2PO_3$, 100-300 mg/L of $CaCl_2 \cdot 2H_2O$, 100-300 mg/L of $MgSO_4 \cdot 2H_2O$, 0.5-1.0 mL/L of a trace element I solution, and 0.5-1.0 mL/L of a trace element II solution, where mL is a unit of the volume of the added trace element I solution or the trace element II solution, L is a unit of the total volume of the influent water, and the above concentrations are the final concentrations of various substances in the influent water; the trace element I solution or the trace element II solution is prepared based on the following matrix ratio with water as a solvent, and the trace element I solution includes: 6-7 g/L of EDTA·2Na, and 5-6 g/L of $FeSO_4 \cdot 7H_2O$; the trace element II solution includes: 18-20 mg/L of EDTA·2Na, 0.01-0.02 mg/L of $H_3BO_3$, 0.4-0.5 mg/L of $ZnSO_4 \cdot 7H_2O$, 0.2-0.3 mg/L of $CoCl_2 \cdot 6H_2O$, 0.2-0.3 mg/L of $CuSO_4 \cdot 5H_2O$, 0.9-1.0 mg/L of $MnCl_2 \cdot 4H_2O$, 0.1-0.2 mg/L of $NiCl_2 \cdot 6H_2O$, and 0.2-0.3 mg/L of $NaMoO_4 \cdot 2H_2O$; after stripping for deaeration by nitrogen, the influent water continuously flows into the anammox reactor through a water inlet pump; the reflux pump controls the reflux ratio at 300-500%, thus preventing the combined zeolite filler from settling;

2.2.2) actual water quality fluctuation phase: the influent water of the anammox reactor is a mixture of domestic sewage and nitrite; the heating rod controls the water inlet temperature within a range of 30-35° C.; the pH value falls within a range of 7-8; the hydraulic retention time is 10-15 h; the concentration of nitrite in the influent water is 30-70 mg/L, the concentration of ammonium therein is 30-70 mg/L, and the ratio of the two fluctuates irregularly at 0.5-2.3; after stripping for deaeration by nitrogen, the influent water continuously flows into the anammox reactor through a water inlet pump; the reflux pump controls the reflux ratio at 300-500%, thus preventing the combined zeolite filler from settling; According to the same principle, zeolites can maintain a relatively stable denitrification efficiency in spite of fluctuating influent substrate ratios; and technical principle:

for anammox bacteria, strict requirements are raised for the environments and substrates, and it is difficult to maintain a stable partial nitrification process in the partial nitrification-anammox process based on the anammox technology, resulting in that the ratio of nitrite to ammonium fluctuates in a large range, and under the impact of such a substrate, it is more difficult for the anammox reaction to maintain a stable efficiency. The physical characteristics of zeolite adsorption of ammonium and the anammox process are combined to achieve a stable wastewater denitrification effect. The flexibility and stability of this technical operation can be explained from two aspects: when the effect of partial nitrification is not ideal, that is, when the corresponding nitrogen element mainly exists in the form of ammonium, and when the ratio of nitrite to ammonium is less than 1.32, the zeolites can absorb excessive ammonium through the ion exchange mechanism; and when the effect of partial nitrification is ideal, that is, when the corresponding nitrogen element mainly exists in the form of nitrite, and when the ratio of nitrite to ammonium is greater than 1.32, the zeolites can utilize the previously adsorbed ammonium again. Under the condition of an inappropriate ratio of nitrite to ammonium, the "buffer" effect of zeolites helps to maintain a relatively stable and appropriate ratio of nitrite to ammonium, so as to achieve a stable denitrification effect of anammox.

The present invention has the following advantages:
1) compared with the traditional nitrification and denitrification processes, the anammox process can save carbon sources and energy, reduce greenhouse gas emissions, and has environmental and economic advantages;
2) zeolite is used as an inexpensive adsorbent, and in-situ regeneration of zeolites is realized through adsorption and desorption, so that the cost is greatly saved, including the cost of chemical regeneration agents; and
3) the operation of the device is simple and easy to realize, without need of complicated operations.

BRIEF DESCRIPTION OF THE DRAWINGS

In FIG. 1: 1—water inlet tank, 2—anammox reactor, 3—water outlet tank; 1.1—heating rod; 1.2—water inlet pump; 2.1—water inlet, 2.2—combined zeolite filler, 2.3—online pH/DO detector, 2.4—reflux inlet, 2.5—reflux pump, and 2.6—overflow port;
In FIG. 2: 2.2.1—polypropylene mesh spherical shell, 2.2.2—zeolite particles, and 2.2.3—polystyrene foams.

DETAILED DESCRIPTION OF THE EMBODIMENTS

Figure 1:
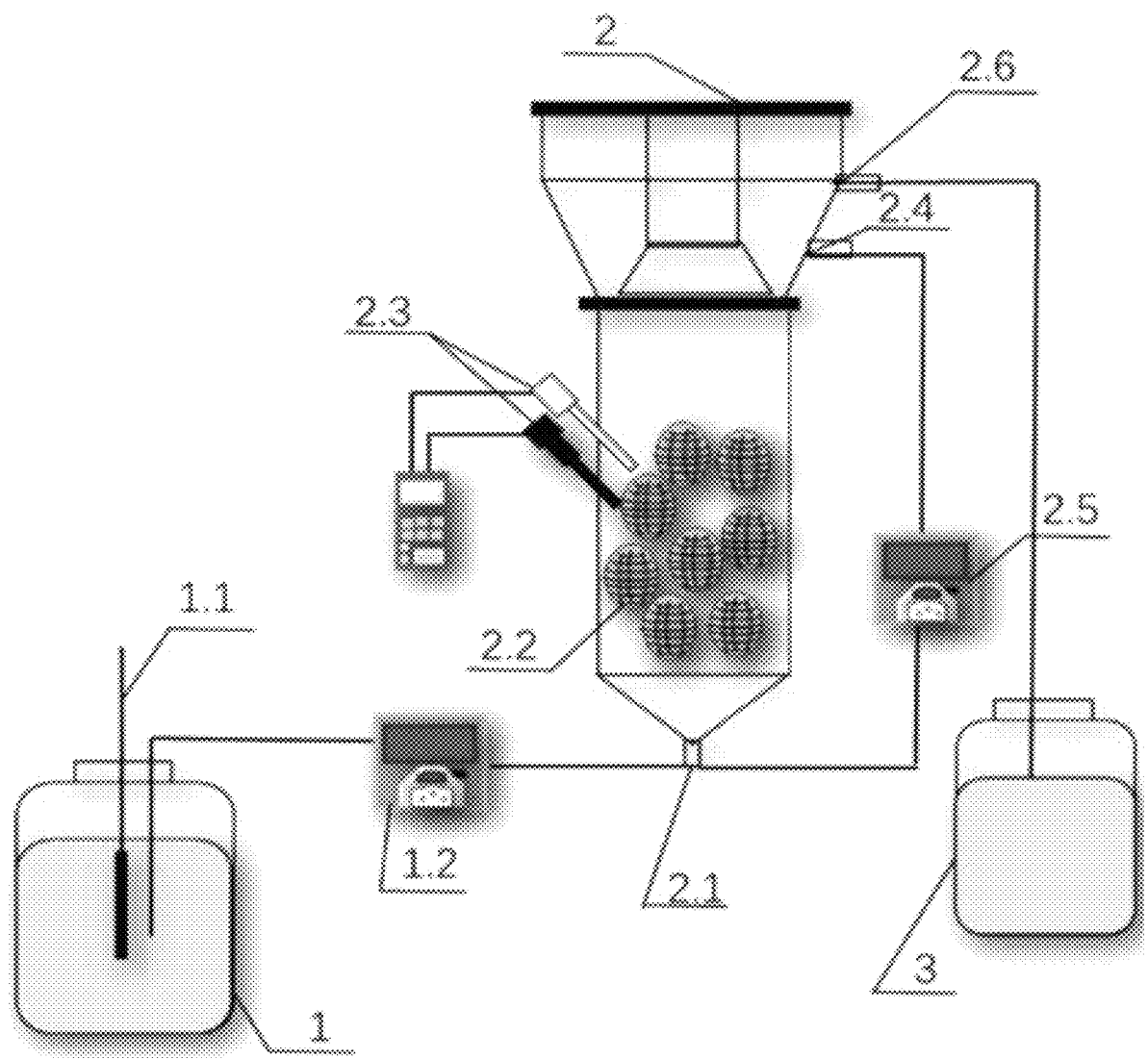
FIG. 1 is a schematic diagram of the structure of a device for maintaining the stability of anaerobic ammonium oxidation (anammox) by using a combined zeolite filler to resist water quality fluctuations.
Figure 2:
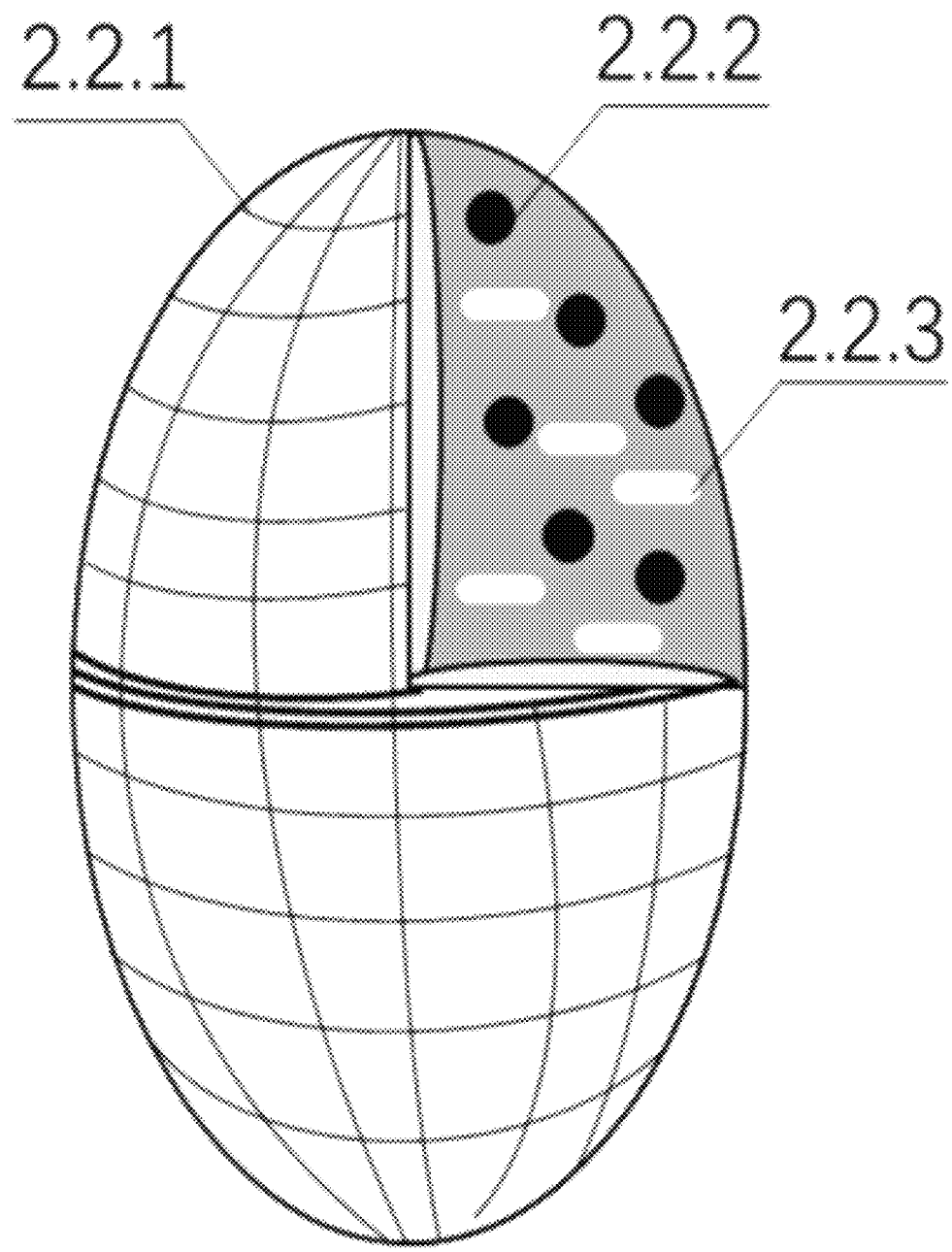
FIG. 2 is a schematic diagram of the combined zeolite filler.

The present invention will be further described in detail below with reference to the accompanying drawings and embodiments.
1. As shown in FIG. 1, a device for maintaining the stability of anammox by using a combined zeolite filler to resist water quality fluctuations includes a water inlet tank (1), an anammox reactor (2), and a water outlet tank (3); the water inlet tank (1) is provided with a heating rod (1.1) and a water inlet pump (1.2); the anammox reactor (2) is provided with a water inlet (2.1), a combined zeolite filler (2.2), an on-line pH/DO detector (2.3), a reflux inlet (2.4), a reflux pump (2.5), and an overflow port (2.6). The combined zeolite filler (2.2) is provided with a polypropylene mesh spherical shell (2.2.1), zeolite particles (2.2.2), and polystyrene foams (2.2.3);
experimental device connection: the water inlet tank (1) is connected with the water inlet (2.1) of the anammox reactor (2) through the water inlet pump (1.2); the anammox reactor (2) is connected with the water outlet tank (3) through the overflow port (2.6);
2. specific operation as follows:
2.1) start-up phase:
the anammox reactor is started in a continuous-flow mode, the inoculated sludge is anammox granular sludge, and the concentration of sludge in the reactor is controlled at 3000±300 mg/L; the heating rod controls the water inlet temperature at 32° C.; the pH value falls within a range of 7.5±0.5; the hydraulic retention time is 10 h; the influent water has a nitrite concentration of 70 mg/L and an ammonium concentration of 50 mg/L; the influent water is specifically composed of the following substances: 70 mgN/L of $NaNO_2$, 50 mgN/L of $NH_4Cl$, 0.5 g/L of $NaHCO_3$, 30 mg/L of $KH_2PO_3$, 300 mg/L of $CaCl_2 \cdot 2H_2O$, 300 mg/L of $MgSO_4 \cdot 2H_2O$, 1.0 mL/L of a trace element I solution, and 1.0 mL/L of a trace element II solution, where mL is a unit of the volume of the added trace element I solution or the trace element II solution, L is a unit of the total volume of the influent water, and the above concentrations are the final concentrations of various substances in the influent water; the trace element I solution or the trace element II solution is prepared based on the following matrix ratio with water as a solvent, and the trace element I solution includes: 6.4 g/L of EDTA·2Na, and 5.0 g/L of $FeSO_4 \cdot 7H_2O$; the trace element II solution includes: 19.11 mg/L of EDTA·2Na, 0.014 mg/L of $H_3BO_3$, 0.43 mg/L of $ZnSO_4 \cdot 7H_2O$, 0.24 mg/L of $CoCl_2 \cdot 6H_2O$, 0.25 mg/L of $CuSO_4 \cdot 5H_2O$, 0.99 mg/L of $MnCl_2 \cdot 4H_2O$, 0.15 mg/L of $NiCl_2 \cdot 6H_2O$, and 0.22 mg/L of $NaMoO_4 \cdot 2H_2O$; after stripping for deaeration by nitrogen, the influent water continuously flows into the anammox reactor through a water inlet pump; the combined zeolite filler is added inside the reactor, the dosing ratio is 40%, and the inside of the polypropylene mesh spherical shell is filled with the zeolite particles with a diameter of 4 mm and the polystyrene foams, the diameters of the two are larger than the mesh diameter of the spherical shell, so that the zeolite particles and the polystyrene foams will not fall out, and the zeolite particles and the polystyrene foams are filled at a volume ratio of 1:1 to ensure that they can be suspended inside the reactor; the reflux pump controls the reflux ratio at 500%, thus preventing the combined zeolite filler from settling; and after 15 days of operation, when the concentrations of nitrite and ammonium in the effluent water are both less than 5 mg/L, and the removal rate of total nitrogen stably remains at above 70%, it indicates that the anammox reactor has been started successfully.
2.2) operation phase:
2.2.1) simulated water quality fluctuation phase: the heating rod controls the water inlet temperature at 32° C.; the pH value falls within a range of 7.5±0.5; the hydraulic retention time is 10 h; the influent water includes nitrite and ammonium whose concentrations fluctuate at 30-70 mg/L, and every two times of hydraulic retention constitutes a cycle: the concentration of nitrite in the influent water in the first hydraulic retention time is 30 mg/L, and the concentration of ammonium therein is 70 mg/L, at this time, relatively excessive ammonium will be adsorbed by zeolites; the concentration of nitrite in the influent water in the second hydraulic retention time is 70 mg/L, and the concentration of ammonium therein is 30 mg/L, in this case, the nitrite is relatively surplus, and the zeolites desorb the ammonium adsorbed in the previous cycle into a liquid phase, thereby providing a substrate for the growth of anammox bacteria; except for nitrite and ammonium in the influent water that are changed in concentrations as above, the other substrates remain unchanged, including: 0.5 g/L of $NaHCO_3$, 30 mg/L of $KH_2PO_3$, 300 mg/L of $CaCl_2 \cdot 2H_2O$, 300 mg/L of $MgSO_4 \cdot 2H_2O$, 1.0 mL/L of a trace element I solution, and 1.0 mL/L of a trace element II solution, where mL is a unit of the volume of the added trace element I solution or the trace element II solution, L is a unit of the total volume of the influent water, and the above concentrations are the final concentrations of various substances in the influent water; the trace element I solution or the trace element II solution is prepared based on the following matrix ratio with water as a solvent, and the trace element I solution includes: 6.4 g/L of EDTA·2Na, and 5.0 g/L of $FeSO_4 \cdot 7H_2O$; the trace element II solution includes: 19.11 mg/L of EDTA·2Na, 0.014 mg/L of $H_3BO_3$, 0.43 mg/L of $ZnSO_4·7H_2O$, 0.24 mg/L of $CoCl_2·6H_2O$, 0.25 mg/L of $CuSO_4·5H_2O$, 0.99 mg/L of $MnCl_2·4H_2O$, 0.15 mg/L of $NiCl_2·6H_2O$, and 0.22 mg/L of $NaMoO_4·2H_2O$; after stripping for deaeration by nitrogen, the influent water continuously flows into the anammox reactor through a water inlet pump; the reflux pump controls the reflux ratio at 500%, thus preventing the combined zeolite filler from settling;

2.2.2) actual water quality fluctuation phase: the influent water of the anammox reactor is a mixture of domestic sewage and nitrite, and the domestic sewage is taken from the family dormitory building of Beijing University of Technology; the heating rod controls the water inlet temperature at 32° C.; the pH value falls within a range of 7.5±0.5; the hydraulic retention time is 10 h; the concentration of nitrite in the influent water is 30-70 mg/L, the concentration of ammonium therein is 30-70 mg/L, and the ratio of the two fluctuates irregularly at 0.5-2.3; after stripping for deaeration by nitrogen, the influent water continuously flows into the anammox reactor through a water inlet pump; the reflux pump controls the reflux ratio at 500%, thus preventing the combined zeolite filler from settling. According to the same principle, zeolites can maintain a relatively stable denitrification efficiency in spite of fluctuating influent substrate ratios, and ammonium and nitrite in the effluent water still maintain a relatively low concentration. After 39 days of operation, the denitrification efficiency of the system reaches and remains at 75%, indicating that efficient denitrification has been achieved through anammox.

What is claimed is:

1. A method for maintaining a stability of an anammox by using a combined zeolite filler to resist water quality fluctuations, wherein a device used in the method comprises a water inlet tank, an anammox reactor, and a water outlet tank, wherein the water inlet tank is provided with a heating rod and a water inlet pump; the anammox reactor is provided with a water inlet, the combined zeolite filler, an on-line pH/DO detector, a reflux inlet, a reflux pump, and an overflow port; the combined zeolite filler is provided with a polypropylene mesh spherical shell, zeolite particles, and polystyrene foams; and the water inlet tank is connected to the water inlet of the anammox reactor through the water inlet pump; and the anammox reactor is connected to the water outlet tank through the overflow port;

the method comprising a start-up phase and operation control phase, wherein start-up and operation control phases are as follows:

2.1) start-up phase:

starting the anammox reactor in a continuous-flow mode, inoculating sludge, wherein the sludge is anammox granular sludge, and controlling a concentration of the sludge in the anammox reactor at 3000-4000 mg/L; controlling a water inlet temperature of an influent water by the heating rod, within a range of 30-35° C.; and controlling a pH value within a range of 7-8 and a hydraulic retention time of 10-15 h; wherein the influent water has a nitrite concentration of 60-90 mg/L and an ammonium concentration of 50-70 mg/L, and a ratio of the nitrite concentration and the ammonium concentration is controlled at 1.32; and the influent water comprises the following substances: 60-90 mgN/L of $NaNO_2$, 50-70 mgN/L of $NH_4Cl$, 0.5-1.0 g/L of $NaHCO_3$, 20-40 mg/L of $KH_2PO_3$, 100-300 mg/L of $CaCl_2·2H_2O$, 100-300 mg/L of $MgSO_4·2H_2O$, 0.5-1.0 mL/L of a first trace element solution, and 0.5-1.0 mL/L of a second trace element solution, wherein mL is a unit of a volume of the first trace element solution or the second trace element solution, L is a unit of a total volume of the influent water, and the above concentrations are final concentrations of various substances in the influent water; and preparing the first trace element solution or the second trace element solution based on the following matrix ratio with water as a solvent, wherein the first trace element solution comprises: 6-7 g/L of EDTA·2Na, and 5-6 g/L of $FeSO_4·7H_2O$, and the second trace element solution comprises: 18-20 mg/L of EDTA·2Na, 0.01-0.02 mg/L of $H_3BO_3$, 0.4-0.5 mg/L of $ZnSO_4·7H_2O$, 0.2-0.3 mg/L of $CoCl_2·6H_2O$, 0.2-0.3 mg/L of $CuSO_4·5H_2O$, 0.9-1.0 mg/L of $MnCl_2·4H_2O$, 0.1-0.2 mg/L of $NiCl_2·6H_2O$, and 0.2-0.3 mg/L of $NaMoO_4·2H_2O$; after stripping for a deaeration by nitrogen, the influent water continuously flowing into the anammox reactor through the water inlet pump; adding the combined zeolite filler inside the anammox reactor, wherein a dosing ratio is 30-40%, and an inside of the polypropylene mesh spherical shell is filled with the zeolite particles with a diameter of 3-8 mm and the polystyrene foams, the diameter of each of the zeolite particles and a diameter of each of the polystyrene foams are larger than a mesh diameter of the polypropylene mesh spherical shell to make the zeolite particles and the polystyrene foams not fall out, and the zeolite particles and the polystyrene foams are filled at a volume ratio of 1:1-1:2 for suspending inside the anammox reactor; controlling a reflux ratio at 300-500% through the reflux pump, to prevent the combined zeolite filler from settling; when the concentrations of nitrite and ammonium in an effluent water are both less than 5 mg/L, and a removal rate of a total nitrogen stably remains at above 70% for more than 14 days, wherein the anammox reactor is started successfully;

2.2) operation control phase:

2.2.1) simulated water quality fluctuation phase: controlling the water inlet temperature of the influent water within the range of 30-35° C. through the heating rod; and controlling the pH value within the range of 7-8 and the hydraulic retention time of 10-15 h; wherein the nitrite concentration and the ammonium concentration in the influent water fluctuate at 30-70 mg/L, and every two hydraulic retention times constitute a cycle: the nitrite concentration in the influent water in a first hydraulic retention time is 30-50 mg/L, and the ammonium concentration in the influent water in the first hydraulic retention time is 50-70 mg/L; the nitrite concentration in the influent water in a second hydraulic retention time is 50-70 mg/L, and the ammonium concentration in the influent water in the second hydraulic retention time is 30-50 mg/L; the influent water comprises the following substances: 30-70 mgN/L of $NaNO_2$, 30-70 mgN/L of $NH_4Cl$, 0.5-1.0 g/L of $NaHCO_3$, 20-40 mg/L of $KH_2PO_3$, 100-300 mg/L of $CaCl_2·2H_2O$, 100-300 mg/L of $MgSO_4·2H_2O$, 0.5-1.0 mL/L of the first trace element solution, and 0.5-1.0 mL/L of the second trace element solution, wherein mL is the unit of the volume of the first trace element solution or the second trace element solution, L is the unit of the total volume of the influent water, and the above concentrations are the final concentrations of the various substances in the influent water; preparing the first trace element solution or the second trace element solution based on the following matrix ratio with water as the solvent, wherein the first trace element solution comprises: 6-7 g/L of EDTA·2Na, and 5-6 g/L of $FeSO_4·7H_2O$; the second trace element solution comprises: 18-20 mg/L of EDTA·2Na, 0.01-0.02 mg/L of $H_3BO_3$, 0.4-0.5 mg/L of $ZnSO_4·7H_2O$, 0.2-0.3 mg/L of $CoCl_2·6H_2O$, 0.2-0.3 mg/L of $CuSO_4·5H_2O$, 0.9-1.0 mg/L of $MnCl_2·4H_2O$, 0.1-0.2 mg/L of $NiCl_2·6H_2O$, and 0.2-0.3 mg/L of $NaMoO_4·2H_2O$; after stripping for the deaeration by nitrogen, the influent water continuously flowing into the anammox reactor through the water inlet pump; controlling the reflux ratio at 300-500% through the reflux pump, to prevent the combined zeolite filler from settling; and 2.2.2) actual water quality fluctuation phase: the influent water of the anammox reactor is a mixture of domestic sewage and nitrite; controlling the water inlet temperature of the influent water within the range of 30-35° C. through the heating rod; and controlling the pH value within the range of 7-8 and the hydraulic retention time of 10-15 h; wherein the nitrite concentration in the influent water is 30-70 mg/L, the ammonium concentration in the influent water is 30-70 mg/L, and the ratio of the nitrite concentration and the ammonium concentration fluctuates irregularly at 0.5-2.3; after stripping for the deaeration by nitrogen, the influent water continuously flowing into the anammox reactor through the water inlet pump; and controlling the reflux ratio at 300-500% through the reflux pump, to prevent the combined zeolite filler from settling.

* * * * *